E. B. HOWELL.
LOCKING DEVICE.
APPLICATION FILED JULY 23, 1918.
1,365,172.
Patented Jan. 11, 1921.
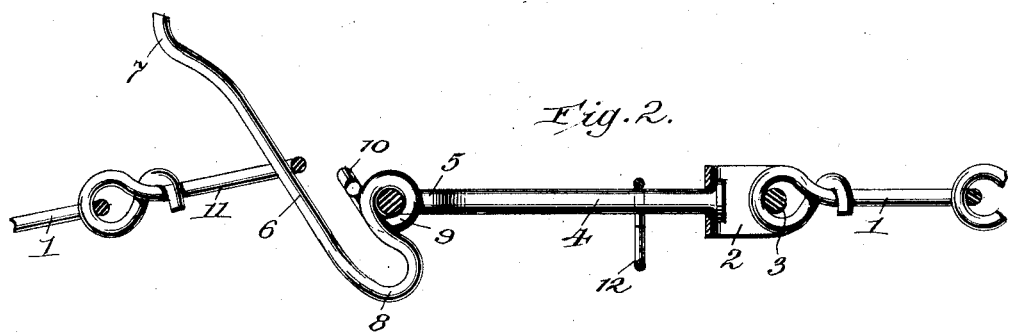
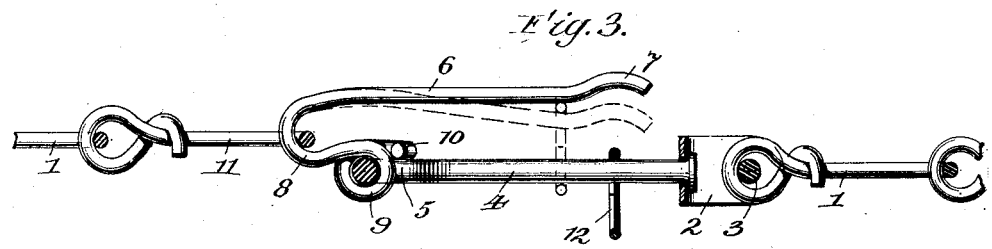
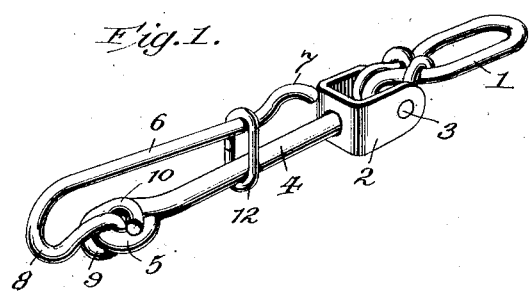
Inventor:
Edward B. Howell,
By Dodge and Sons
Attorneys

UNITED STATES PATENT OFFICE.

EDWARD B. HOWELL, OF BUTTE, MONTANA.

LOCKING DEVICE.

1,365,172.  Specification of Letters Patent.  Patented Jan. 11, 1921.

Application filed July 23, 1918. Serial No. 246,314.

*To all whom it may concern:*

Be it known that I, EDWARD B. HOWELL, a citizen of the United States, residing at Butte, in the county of Silverbow and State of Montana, have invented certain new and useful Improvements in Locking Devices, of which the following is a specification.

My present invention pertains to an improved locking device adapted more particularly for use in conjunction with antiskid chains employed upon automobile tires. Various devices of a similar nature have been heretofore proposed and patented, but the present structure affords a simple arrangement which will draw the chain elements together to a sufficient extent and which will likewise remain in its locked position under stress or strains incident to use. The construction also is such that one may readily release the same by an ordinary tool such as a hammer, wrench or screwdriver without the necessity of handling the locking device, which, of course, is a matter of some moment when the machine has been running through mud or slush.

The structure is illustrated in the annexed drawings wherein,—

Figure 1 is a perspective view of the locking device in its closed position;

Fig. 2 a sectional elevation showing the device in its open position ready to be closed, and Fig. 3 a similar view with the locking device brought to a substantially closed position in full lines and in locked position in dotted lines.

In the various views 1 denotes a link of the chain which is connected to a head or yoke shaped member 2 by a through-pin or rivet 3. A draw-bar 4 is swiveled in the head of the yoke and is provided with an eye 5 at its outer end. The locking lever is produced from a single piece of spring wire bent to form. It may be said to comprise an arm or lever 6, the free end of which is preferably providel with a hump or enlargement 7, the purpose of which will presently appear. The other end is turned inwardly forming a loop 8, an eye 9 and an inturned finger 10. The eye 9 stands at right angles to the eye 5, passing therethrough, and the finger 10 lies parallel to the opening of eye 9 but at right angles to the eye 5. In other words, finger 10 bears against the adjacent faces of the eye 5 and the draw-bar 4 and in effect forms a stop for the swinging movement of one end relatively to the other when the lever 6 is drawn inwardly toward its closed position. 11 indicates a link upon the opposite end of the chain from the link 1.

In operation, the end 7 of the locking lever 6 is passed through the link 11, as indicated in Fig. 2, and the lever is swung over toward the draw-bar 4 until it arrives at the position shown in full lines in Fig. 3. At this moment the locking finger 10 contacts the draw-bar and resists further swinging movement of the lever with reference to or toward the draw-bar. The swinging movement of the lever, by reason of its construction, tends to draw the link 11 inwardly toward the eye 5 and puts sufficient tension upon the chain to take up the slack thereof so that the chain will be held in place. When the parts reach the position shown in full lines in Fig. 3 the lever 6, which, as above noted is made of spring material, will be forced downwardly toward the draw-bar, and a ring or loop 12 which encircles the draw-bar will be slipped over the free end of the lever and past the projection or hump 7 at which time the lever is freed of pressure by the operator. Owing to its spring action the lever tends to swing outwardly away from the draw-bar and as a consequence the loop 12 will be firmly held in its position in rear of the projection 7 and the parts thus held in their locked position. As will be readily appreciated, if one desires to release the device, all that is necessary to do is to force the loop 12 outwardly over the hump 7. The spring action of the lever will then throw the parts into the position shown in Fig. 2 and this release may be effected by the use of tools, as above mentioned, without the necessity of the user touching the parts at all.

While I have shown the fastening device as swiveled to the head or yoke 2, it is, of course, not essential that such a swivel arrangement be employed, though the swivel has its advantages, as will be apparent.

I claim:—

1. A fastening device of the character specified comprising in combination a draw-bar; a locking lever pivoted to one end thereof, said lever being formed of spring metal; means for locking the lever in its closed position; and a stop serving to arrest the movement of the lever short of its fully closed position whereby the parts may be flexed and placed under tension before the locking means can be brought to its final locking position.

2. A fastening device of the character specified, comprising in combination, a draw-bar having an eye in its outer end; a resilient locking lever pivoted in said eye and carrying a stop member adapted to contact the draw-bar and to limit the swinging movement of the lever toward the bar; and means for locking the lever in place when it is forced to place against the action of the stop member.

3. A fastening device of the character specified, comprising in combination, a draw-bar having an eye in its outer end; a locking lever formed from a single piece of spring wire bent to form, said lever having an eye passing through the eye in the draw-bar, and a stop finger adapted to contact the bar and to prevent further swinging movement of the lever toward the bar; and a loop encircling the bar and adapted to pass over and hold the lever in its closed position when the lever is forced downwardly toward the bar into its closed position.

4. A fastening device of the character specified, comprising in combination, a draw-bar having an eye in its outer end; a locking lever formed from a single piece of spring wire bent to form, said lever having an eye passing through the eye in the drawbar, and a stop finger adapted to contact the bar and to prevent further swinging movement of the lever toward the bar, said lever at its free end having a hump, and a loop encircling the bar and adapted to pass over and hold the lever in closed position when the lever is forced downwardly toward the bar into its closed position.

In testimony whereof I have signed my name to this specification.

EDWARD B. HOWELL.